(12) United States Patent
Kawasaki (10) Patent No.: US 12,407,941 B2
(45) Date of Patent: Sep. 2, 2025

(54) IMAGING APPARATUS, METHOD, AND MEDIUM

(71) Applicant: CANON KABUSHIKI KAISHA, Tokyo (JP)

(72) Inventor: Ryo Kawasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 18/592,302

(22) Filed: Feb. 29, 2024

(65) Prior Publication Data

US 2024/0305897 A1 Sep. 12, 2024

(30) Foreign Application Priority Data

Mar. 7, 2023 (JP) ................................. 2023-034800

(51) Int. Cl.
| | |
|---|---|
| *H04N 23/75* | (2023.01) |
| *G06V 10/60* | (2022.01) |
| *H04N 23/11* | (2023.01) |
| *H04N 23/74* | (2023.01) |

(52) U.S. Cl.
CPC ............. *H04N 23/75* (2023.01); *G06V 10/60* (2022.01); *H04N 23/11* (2023.01); *H04N 23/74* (2023.01)

(58) Field of Classification Search
CPC ........ H04N 23/75; H04N 23/11; H04N 23/74; H04N 23/55; G06V 10/60
See application file for complete search history.

(56) References Cited

U.S. PATENT DOCUMENTS

| | | | |
|---|---|---|---|
| 9,113,117 B2 | 8/2015 | Nakata et al. | |
| 2002/0044212 A1* | 4/2002 | Hashimoto | ............ H04N 23/55 |
| | | | 348/335 |
| 2013/0194469 A1 | 8/2013 | Nakata et al. | |
| 2015/0138368 A1* | 5/2015 | Suzuki | ................. H04N 23/631 |
| | | | 348/164 |
| 2015/0358527 A1* | 12/2015 | Niida | ..................... G03B 11/00 |
| | | | 348/211.3 |
| 2016/0037049 A1* | 2/2016 | Niida | ..................... G03B 11/00 |
| | | | 348/211.3 |
| 2021/0318508 A1* | 10/2021 | Sugaya | ................ G02B 26/023 |

FOREIGN PATENT DOCUMENTS

| | | |
|---|---|---|
| JP | 2004229034 A | 8/2004 |
| JP | 2010093525 A | 4/2010 |
| JP | 2013176036 A | 9/2013 |

* cited by examiner

*Primary Examiner* — Shahbaz Nazrul
(74) *Attorney, Agent, or Firm* — Canon U.S.A., Inc. IP Division (57) ABSTRACT

An imaging apparatus includes at least one processor, and a memory coupled to the at least one processor. The memory stores instructions that, when executed by the at least one processor, cause the at least one processor to acquire a parameter related to a brightness of a subject; determine whether to insert a first filter configured to attenuate infrared light into a light path of an imaging optical system, based on whether the acquired parameter satisfies a predetermined condition; and correct the predetermined condition based on whether a second filter different from the first filter and configured to attenuate light is inserted into the light path of the imaging optical system.

20 Claims, 6 Drawing Sheets

FIG.6

IMAGING APPARATUS, METHOD, AND MEDIUM

BACKGROUND

Field of the Disclosure

The present disclosure relates to an imaging apparatus, a method, and a medium.

Description of the Related Art

In recent years, imaging apparatuses such as video cameras have been equipped with the function of controlling exposure at and after imaging of a subject, as a control for changing the brightness of image data to be acquired by imaging the subject. As a method for controlling the exposure, it is a common practice to change exposure conditions, such as the aperture diameter of a diaphragm, the transmittance (degree of dimming) of light of an optical filter such as a neutral density (ND) filter, the accumulation time of electric charges in an imaging element, and the gain of an image signal. For the sake of simplification, in the following description, the exposure conditions will be called an aperture value, the transmittance (degree of dimming) of an ND filter, an accumulation time, and a gain. The exposure conditions can be changed by a manual change method in which a user optionally changes the exposure conditions by performing manual operations and an automatic change method in which an imaging apparatus changes the exposure conditions by an automatic control, or the exposure conditions can be changed by a combination of some of the manual operations of the user and the automatic control of the imaging apparatus.

The color vision characteristic that is the sensitivity characteristic of a human with respect to colors and the spectral luminous efficiency characteristic that is the sensitivity characteristic of a human with respect to brightness have sensitivities in a range from 380 nm to 780 nm, which is called a visible range.

On the other hand, these characteristics hardly have sensitivities in a range of wavelengths longer than 700 nm. Thus, an imaging apparatus generally includes, in front of an imaging element, an infrared cut filter for correction of vision sensitivity that does not pass light rays in the near-infrared region in order to match the color reproducibility with the a human color vision characteristics (day mode).

However, under low illuminance conditions under which the brightness of the subject is low, the imaging apparatus frequently allows light rays to pass through the near-infrared region by removing the infrared cut filter from the light path to increase the sensitivity (night mode). In the night mode, however, since the color balance is lost due to the passage of the light rays in the near infrared region, it is a common practice to switch to not a color image but a monochrome image. As a method for switching between the day mode and the night mode, there is a function called "auto day-night" with which the imaging apparatus automatically performs a mode determination in accordance with the brightness of the subject.

For example, Japanese Patent Application Laid-Open No. 2013-176036 discusses a method by which the brightness of a subject is acquired based on the exposure conditions of a camera and the luminance of an image, and the auto day-night is performed based on the comparison with a mode switching threshold. According to the method for acquiring the brightness of a subject described above, in environments with a lot of infrared light, the value of the brightness greatly varies depending on the presence or absence of an infrared cut filter, it is known that a failure such as hunting of mode switching is likely to occur. In view of this, Japanese Patent Application Laid-Open No. 2004-229034 discusses a method by which the brightness of a subject is acquired based on the output of an illuminance measurement element provided separately from a subject imaging optical system to perform the auto day-night stably even in environments with a lot of infrared light. In addition, there is a technique for switching the modes at an optimum timing by correcting the switching threshold of the auto day-night. Japanese Patent Application Laid-Open No. 2013-176036 discusses a method for correcting the threshold in accordance with the maximum gain. Japanese Patent Application Laid-Open No. 2010-93525 discusses a method for correcting the threshold in accordance with the amount of infrared light.

SUMMARY

According to an aspect of the present disclosure, an imaging apparatus includes at least one processor and a memory coupled to the at least one processor. The memory stores instructions that, when executed by the at least one processor, cause the at least one processor to acquire a parameter related to a brightness of a subject; determine whether to insert a first filter configured to attenuate infrared light into a light path of an imaging optical system, based on whether the acquired parameter satisfies a predetermined condition; and correct the predetermined condition based on whether a second filter different from the first filter and configured to attenuate light is inserted into the light path of the imaging optical system.

Further features of various embodiments of the present disclosure will become apparent from the following description of exemplary embodiments with reference to the attached drawings.

DESCRIPTION OF THE EMBODIMENTS

Hereinafter, a first exemplary embodiment of the present disclosure will be described in detail. Exemplary embodiments described below are examples for implementing the present disclosure, and should be modified or changed as appropriate depending on the configuration and various conditions of the apparatus to which the present disclosure is applied. Some embodiments of the present disclosure are limited to the following exemplary embodiments. Some of the exemplary embodiments described below may be combined as appropriate.

Apparatus Configuration

Figure 1:
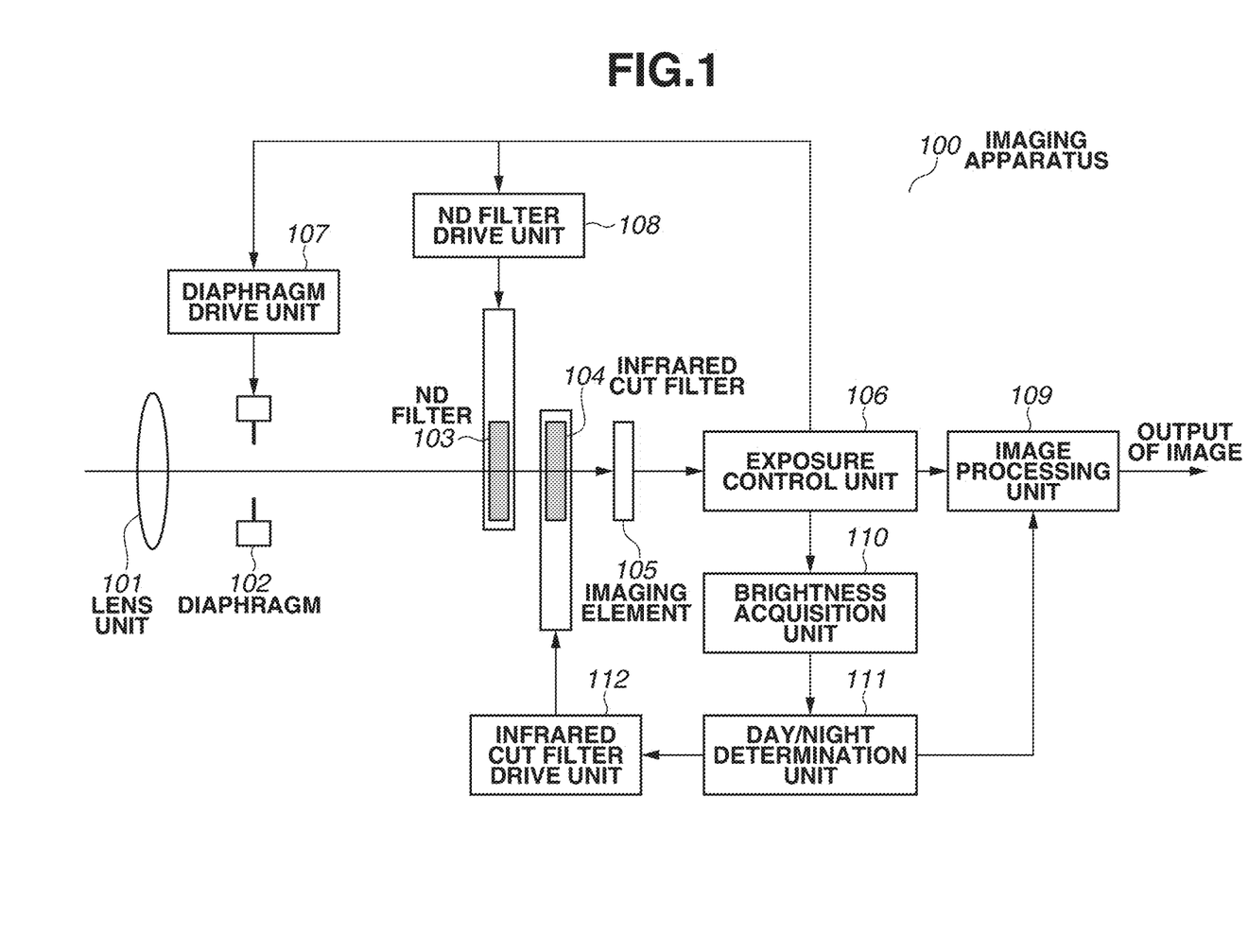
FIG. 1 is a diagram illustrating an example of an apparatus configuration of an imaging apparatus.

FIG. 1 is a block diagram illustrating an example of a basic configuration of an imaging apparatus 100 according to the present exemplary embodiment. Light from a subject enters an imaging element 105 via an imaging optical system including a lens unit 101 and a diaphragm 102.

A neutral density (ND) filter (second filter) 103 is a filter that attenuates light and is insertable into and removable from the light path of the imaging optical system. The light having passed through the ND filter 103 is attenuated in accordance with the transmittance of the ND filter 103 and enters the imaging element 105. In the present exemplary embodiment, the ND filter 103 is a filter with a predetermined transmittance (for example, 1/64). An infrared cut filter (first filter) 104 is a filter that attenuates infrared light and is insertable into and removable from the light path of the imaging optical system. The infrared cut filter 104 is a filter with a predetermined transmittance, but its transmittance is lower than that of the ND filter 103, and the infrared light having passed through the infrared cut filter 104 is attenuated to a degree that the amount of the light can be ignored.

An exposure control unit 106 controls the diaphragm 102 via a diaphragm drive unit 107 and controls the insertion and removal of the ND filter 103 via an ND filter drive unit 108 such that the luminance of a subject becomes appropriate in accordance with the amount of incident light on the imaging element 105. Besides the foregoing controls, the exposure control unit 106 also controls the accumulation time and the gain. An image processing unit 109 performs various kinds of image processing, such as white balance adjustment, contrast adjustment, and noise reduction; generates an image file in Joint Photographic Experts Group (JPEG) format or the like; and outputs the generated image file as an image.

A brightness acquisition unit (acquisition unit) 110 acquires a parameter related to the brightness of a subject based on the aperture value, the accumulation time, the gain, the inserted or removed state of the ND filter (or the transmittance of the ND filter), and the luminance of the image set by the exposure control unit 106, and transmits the parameter to a day/night determination unit 111. As an example of an acquisition method, the brightness of a subject can be calculated as follows:

The brightness of a subject=$AV$ (aperture value)+$TV$ (accumulation time)−$SV$ (gain)+$NV$ (ND filter)+ $BV$ (the luminance of the image).

The method for acquiring (the parameter related to) the brightness of a subject may be another method, such as a method of acquiring the brightness of a subject based on the output of an illuminance measurement element that is provided separately from the imaging element 105. The parameter related to the brightness of a subject is a parameter for how bright the subject is. The parameter is larger as the subject is brighter, and the parameter is smaller as the subject is darker. As indicated in the foregoing equation, the parameter is not a parameter that depends only on the luminance of the image but is a parameter for estimating the original brightness of the subject.

The day/night determination unit 111 determines the imaging mode to either of a day mode and a night mode based on the information (parameter) transmitted from the brightness acquisition unit 110. More specifically, the day/night determination unit 111 determines either of the day mode and the night mode as the imaging mode based on whether the parameter acquired by the brightness acquisition unit 110 satisfies a predetermined condition. The day mode is a mode in which imaging is performed in the state where the infrared cut filter 104 is inserted into the light path of the imaging optical system, and the night mode is a mode in which imaging is performed in the state where the infrared cut filter is removed from the light path of the imaging optical system. Therefore, the day/night determination unit 111 instructs an infrared cut filter drive unit 112 to insert or remove the infrared cut filter 104, thereby to insert or remove the infrared cut filter 104. In the night mode, the image processing unit 109 converts a color image into a monochrome image to ignore the disturbance of colors caused by incidence of the infrared light on the imaging element 105.

Figure 2:
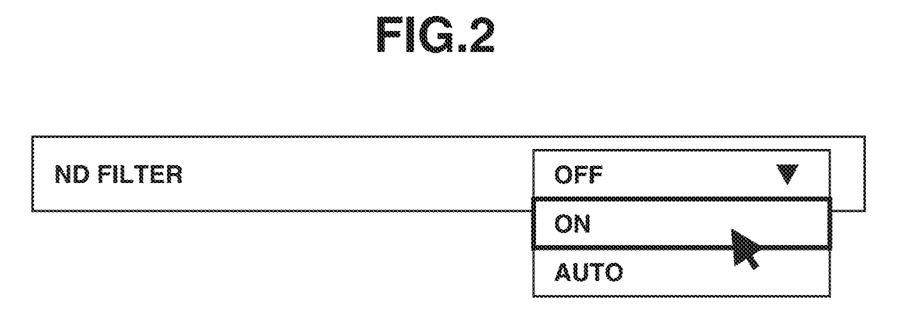
FIG. 2 is a diagram illustrating an example of neutral density (ND) filter setting.

Next, an example of a user setting related to the ND filter will be described with reference to FIG. 2. FIG. 2 is a diagram illustrating a user interface (UI) for the user setting related to the ND filter of the imaging apparatus 100 according to the present exemplary embodiment. The UI illustrated in FIG. 2 is displayed on a display device (not illustrated) via a client device (not illustrated) connected to the imaging apparatus 100 via a network. The options for the user setting displayed in the UI are "OFF", "ON", and "Auto". The "OFF" and "ON" are manual modes. The "OFF" is a mode in which imaging is performed in the state where the ND filter 103 is always removed from the optical path of the imaging optical system, and the "ON" is a mode in which imaging is performed in the state where the ND filter 103 is always inserted into the optical path of the imaging optical system. On the other hand, the "Auto" is a mode in which the exposure control unit 106 performs automatic insertion/removal control on the ND filter 103 such that the luminance of the subject becomes appropriate in accordance with the amount of light incident on the imaging element 105.

Figure 3:
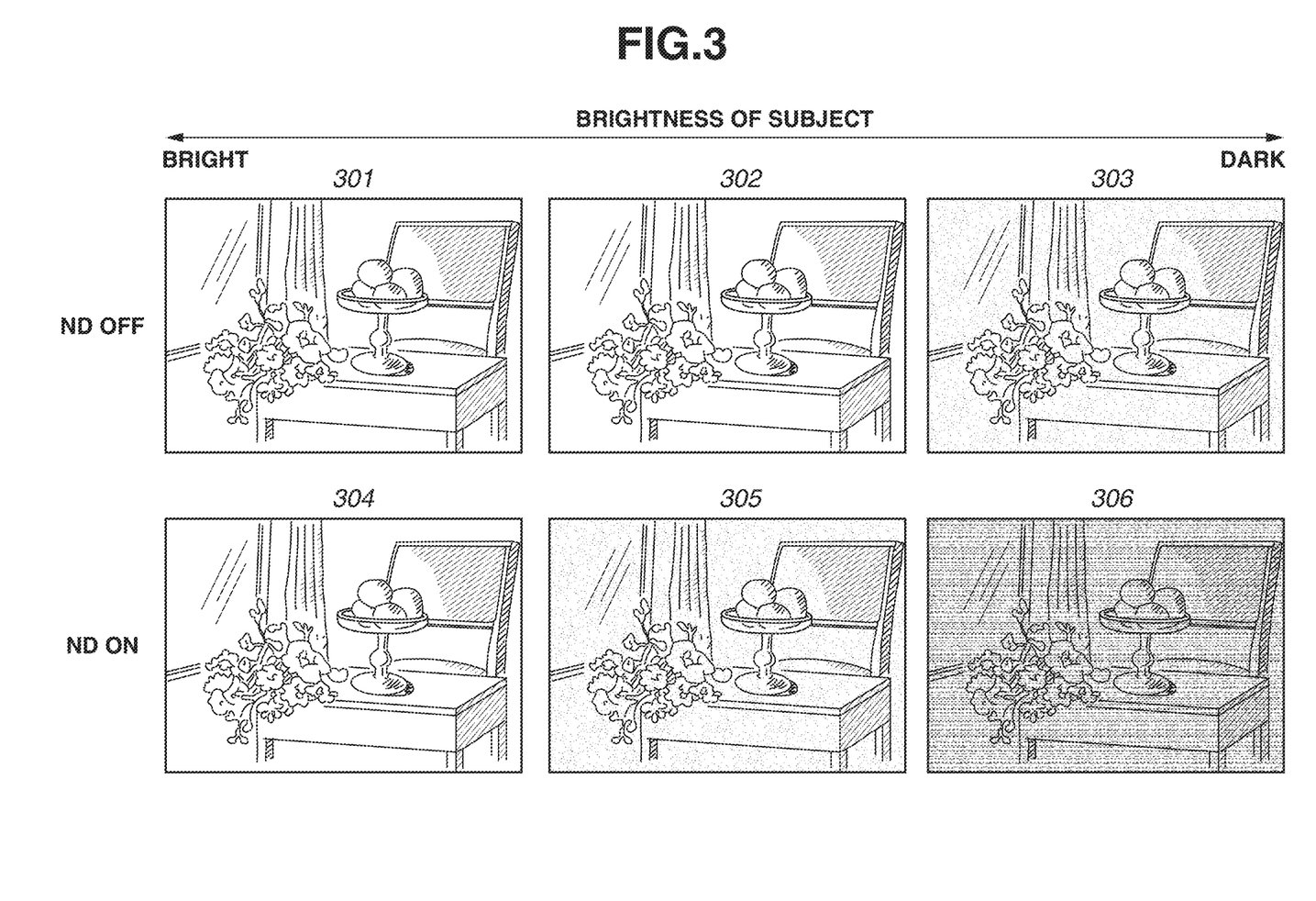
FIG. 3 is a diagram illustrating correction of a threshold for determining a day mode or a night mode.

Next, predetermined conditions for switching between the day mode and the night mode will be described with reference to FIG. 3. FIG. 3 illustrates image examples with a subject at different brightness levels. The examples 301 to 303 are examples where the user setting of the ND filter is "OFF", and the examples 304 to 306 are examples where the user setting of the ND filter is "ON". The horizontal axis indicates the brightness of the subject, and the subject becomes daker from the left to the right sides. The example 301 indicates that the subject is sufficiently bright and the image quality is high, and the example 302 indicates that high image quality is maintained under exposure control such as opening the diaphragm and lengthening the accumulation time. The example 303 indicates that the image quality is low with a lot of noise as a result of an increase in the gain due to the exposure control. In the technical field in which importance is placed on the visibility of the subject such as monitoring cameras, low image quality caused by an increase in the gain, as in the example 303, is not desired. Thus, the imaging mode is desirably switched to the night mode before the image quality is decreased as in the example 303. This is because when the infrared cut filter is removed from the optical path of the imaging optical system, the amount of light incident on the imaging element is increased by the amount of the infrared right, and the gain is decreased due to the exposure control, whereby it is possible to prevent a degradation in the quality of the image.

Therefore, if the parameter acquired by the brightness acquisition unit 110 is equal to or greater than a first threshold, the day/night determination unit 111 determines that the brightness of the subject is sufficient, and determines that the infrared cut filter 104 is to be inserted into the light path of the imaging optical system. On the other hand, if the parameter acquired by the brightness acquisition unit 110 is smaller than the second threshold, the day/night determination unit 111 determines that there may occur a degradation in the quality of the image due to an increase in the gain, and determines that the infrared cut filter 104 is to be removed from the optical path of the imaging optical system.

If the user setting of the ND filter is "Auto", images similar to the image examples in the case of "ON" are obtained. This is because when the subject becomes dark, the ND filer is automatically removed. On the other hand, in the examples 304 to 306, since the light is reduced by the ND filter 103, the gain is likely to increase as compared to the case where the user setting of the ND filter is "OFF", and the image is low in quality even with the same brightness of the subject (305). When the subject becomes darker, the visibility further becomes significantly deteriorated (306). Therefore, if the user setting of the ND filter is "ON", it is necessary to switch to the night mode in the state where the subject is brighter (that is, the acquired parameter is larger) than in the case where the user setting of the ND filter is "OFF".

In the configuration in which a threshold is set to the luminance of the image, the above-described issue does not occur. This is because the luminance of the image changes in accordance with the inserted/removed state of the ND filter and the imaging mode is switched to the night mode at appropriate brightness without changing the threshold. However, in the configuration in which the imaging mode is switched based on the luminance of the image, there occurs an issue that the imaging mode cannot be appropriately switched to the night mode for the image that is bright but contains noise due to an increase in the gain.

In addition, since the luminance of the image can be arbitrarily changed by the exposure settings, the switching between the night mode and the day mode using the luminance of the image may cause low robustness. This may cause unintended switching between the night mode and the day mode by changing the exposure settings, which is not desirable. On the other hand, the parameter related to the brightness of a subject is a parameter based on the exposure settings and the luminance of an image and is a parameter for estimating the original brightness of the subject, and thus the parameter related to the brightness of a subject is high in robustness and is appropriate as an index for switching the imaging mode.

However, the parameter related to the brightness of a subject does not change depending on the insertion or removal of the ND filter 103. More precisely, the luminance of an image changes as much as the brightness is changed by the ND filter 103, and thus the brightness of the subject remains unchanged. This is why the above-described problems will occur.

To solve these problems, the day/night determination unit (correction unit) 111 of the imaging apparatus 100 according to the present exemplary embodiment corrects predetermined conditions (the first threshold and the second threshold) based on whether the ND filter 103 is inserted into the optical path of the imaging optical system. More specifically, if the ND filter 103 is inserted into the optical path of the imaging optical system, the day/night determination unit 111 corrects the first threshold and the second threshold so as to be increased. The day/night determination unit 111 determines the amount of correction to increase the first threshold and the second threshold in accordance with the transmittance (degree of dimming) of the ND filter 103. For example, if the transmittance of the ND filter 103 is ¼, the day/night determination unit 111 corrects the first threshold and the second threshold by two steps (+2), and if the transmittance of the ND filter 103 is 1/64, the day/night determination unit 111 corrects the first threshold and the second threshold by six steps (+6). These correction amounts are stored in advance in an auxiliary storage device (storage unit) (not illustrated) or the like. In the present exemplary embodiment, the transmittance (degree of dimming) of the ND filter 103 is a predetermined value, but the transmittance may be changeable by using an ND filter made by synthesizing a plurality of ND filters different in transmittance or switching among a plurality of ND filters different in transmittance. In that case, as the UI for the user setting of the ND filter, a UI to accept an input of the value of transmittance is further provided in addition to the options "ON", "OFF", and "Auto", and the correction amount is determined in accordance with the input transmittance.

Figure 4:
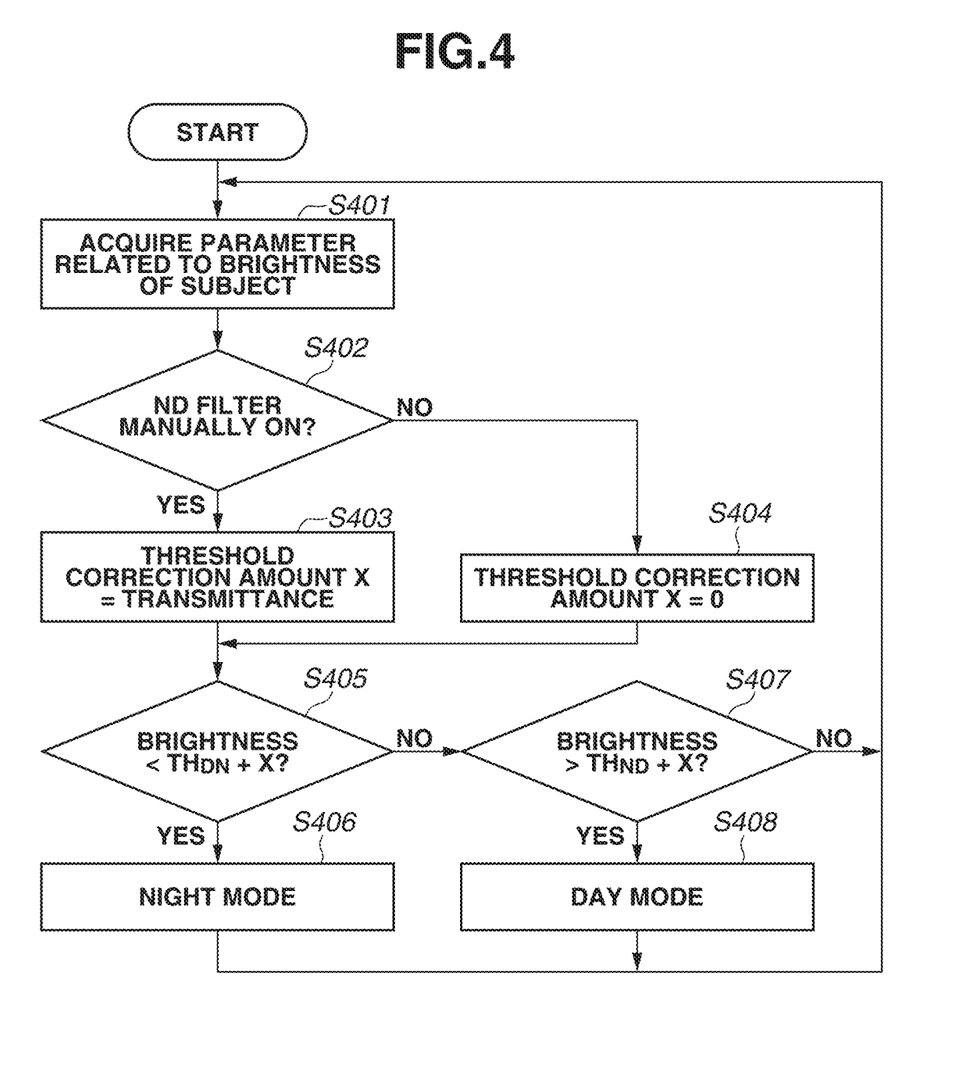
FIG. 4 is a flowchart illustrating an example of operations of the imaging apparatus.

Next, an auto day-night process by the imaging apparatus 100 according to the first exemplary embodiment will be described with reference to the flowchart illustrated in FIG. 4. The operations illustrated in FIG. 4 are executed by a central processing unit (CPU) described below when the CPU copies a program for the auto day-night process stored in a read only memory (ROM) to a random access memory (RAM) and reads the program line by line.

In step S401, the brightness acquisition unit 110 acquires a parameter related to the brightness of a subject. In step S402, it is determined whether the user setting of the ND filter 103 is "ON", and if the setting is "ON" (YES in step S402), then in step S403, a threshold correction amount X is set to a value corresponding to the transmittance (degree of dimming) of the ND filter 103. In the present exemplary embodiment, although it is determined whether the user setting of the ND filter 103 is "ON", this determination may be made based on whether a detection unit (not illustrated) detects that the ND filter 103 is inserted into or removed from the light path of the imaging optical system, or may be made based on a change in the luminance of the image. The correction according to the transmittance (degree of dimming) is made as described above. If the user setting of the ND filter 103 is other than "ON" (NO in step S403), then in step S404, the threshold correction amount X is set to zero because the threshold correction is not necessary.

In step S405, it is determined whether the parameter related to the brightness of the subject acquired in step S401 is smaller than a night mode-switching determination threshold. The night mode-switching determination threshold is calculated by adding the correction amount X set in step S403 or S404 to a preset reference threshold (second threshold) $TH_{DN}$.

If the result of the determination in step S405 is "true" (YES in step S405), then in step S406, the imaging mode is set to the night mode, and the day/night determination unit 111 instructs the infrared cut filter drive unit 112 to remove the infrared cut filter 104 from the light path of the imaging optical system.

If the result of the determination in step S405 is "false" (NO in step S405), then in step S407, it is determined whether the brightness of the subject acquired in step S401 is equal to or greater than a day mode-switching determination threshold. The day mode-switching determination threshold is calculated by adding the correction amount X acquired in step S403 or S404 to a preset reference threshold (first threshold) $TH_{ND}$. The reference threshold $TH_{ND}$ is set so as to indicate higher brightness than the reference threshold $TH_{DN}$. This is to prevent hunting by providing hysteresis.

If the result of the determination in step S407 is "true" (YES in step S407), then in step S408, the imaging mode is set to the day mode, and the day/night determination unit 111 instructs the infrared cut filter drive unit 112 to insert the infrared cut filter 104 into the light path of the imaging optical system. If the result of the determination in step S407 is "false" (NO in step S407), the processing returns to step S401.

In the present exemplary embodiment described above, if the ND filter 103 is manually inserted, it is possible to switch between the day mode and the night mode at an appropriate timing by correcting the day-night switching determination threshold in accordance with the transmittance (degree of dimming) of the ND filter 103. Similar effects can be obtained by decreasing the parameter related to the brightness of the subject by the correction amount and comparing the parameter with the first threshold or the second threshold.

Hereinafter, a second exemplary embodiment of the present disclosure will be described. Components and processes of the second exemplary embodiment similar to those of the first exemplary embodiment are given the same reference signs and numerals as those of the first exemplary embodiment, and the description thereof will be omitted.

In the first exemplary embodiment, the transmittance (degree of dimming) of the ND filter mounted in the imaging apparatus 100 is acquired by storing in advance the transmittance (degree of dimming). However, considering the influences of manufacturing errors and age degradation of the ND filter, there is a concern that the actual transmittance (degree of dimming) does not match the stored transmittance (degree of dimming). Thus, in the second exemplary embodiment, the influences of manufacturing errors and age degradation are reduced by measuring a change in the amount of light before and after the insertion or removal of the ND filter.

Figure 5:
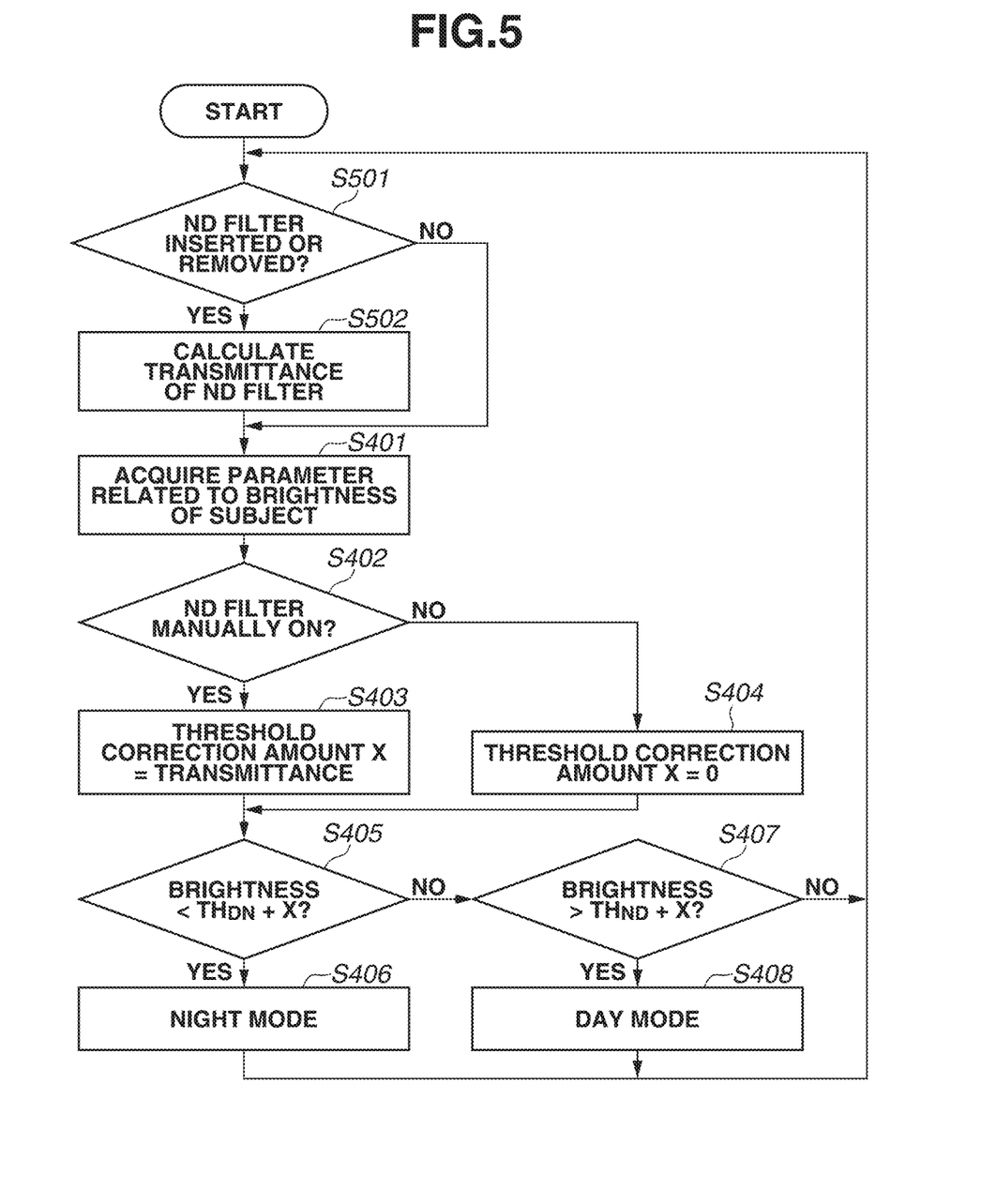
FIG. 5 is a flowchart illustrating an example of operations of the imaging apparatus.

An auto day-night process by an imaging apparatus 100 according to the second exemplary embodiment will be described with reference to the flowchart illustrated in FIG. 5. The operations illustrated in FIG. 5 are also executed by a CPU reading a program line by line.

First, in step S501, it is determined whether the insertion or removal of an ND filter 103 has occurred. The insertion and removal of the ND filter are executed at the time of switching between settings "OFF" and "ON" in the manual mode and at the time of automatic control in the auto mode.

If the insertion or removal of the ND filter 103 has occurred (YES in step S501), then in step S502, a day/night determination unit (correction unit) 111 calculates the transmittance (degree of dimming) of the ND filter 103. The transmittance (degree of dimming) of the ND filter 103 is equivalent to a change in the amount of light before and after the insertion or removal of the ND filter 103, and thus can be calculated as follows:

The transmittance (degree of dimming) of ND filter=the amount of light at removal of ND filter−the amount of light at insertion of ND filter.

The amount of light can be calculated by using exposure parameters and the luminance of the image as follows:

The amount of light=$AV$ (aperture value)+$TV$ (accumulation time)−$SV$ (gain)+$BV$ (luminance of image).

Subsequent steps S401 to S408 are similar to those of the first exemplary embodiment. In this manner, the transmittance is calculated based on the difference between the amount of light with the ND filter 103 inserted and the amount of light with the ND filter 103 removed. Also, the transmittance can be calculated by determining the difference between the parameter related to brightness with the ND filter 103 inserted and the parameter related to brightness with the ND filter 103 removed.

In the second exemplary embodiment described above, the change in the amount of light before and after the insertion or removal of the ND filter 103 is measured in addition to the configuration in the first exemplary embodiment, whereby it is possible to reduce the influences of manufacturing errors and age degradation of the ND filter 103 and automatically switch between the day mode and the night mode at an optimum timing.

Hardware Configuration

Figure 6:
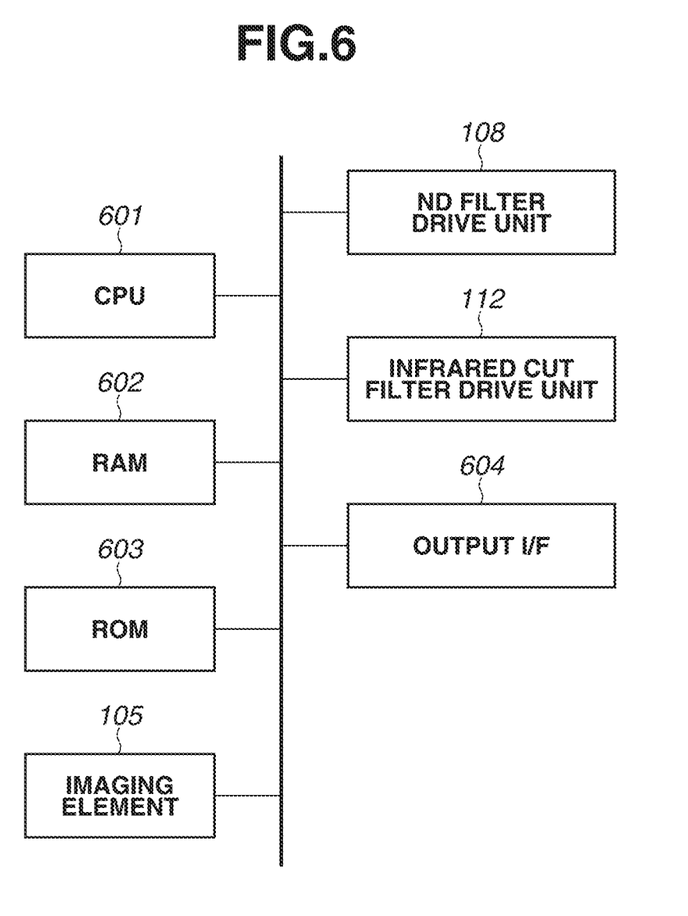
FIG. 6 is a diagram illustrating an example of a hardware configuration of the imaging apparatus.

A hardware configuration of the imaging apparatus 100 according to the first or second exemplary embodiment will be described. FIG. 6 is a diagram illustrating an example of a hardware configuration of the imaging apparatus 100 according to the first or second exemplary embodiment. The respective hardware configurations of the imaging apparatus 100 according to the first and second exemplary embodiments are the same as each other, and both of the imaging apparatuses according to the first and second exemplary embodiments include a CPU 601, a RAM 602, a ROM 603, and an output interface (I/F) 604. Components similar to the components illustrated in FIG. 1 are given the same reference signs and numerals as those illustrated in FIG. 1, and the description thereof will be omitted.

The functions implemented by software in the components of the imaging apparatus 100 are implemented by the CPU 601 copying a program stored in the ROM 603 to the RAM 602 and reading the program line by line.

The output I/F 604 is an interface via which an imaging apparatus 100 outputs an image captured by the imaging apparatus 100 to an external apparatus. The hardware configuration illustrated in FIG. 6 is a mere example and may include an auxiliary storage device, a communication I/F, an input I/F, and other components, which are not illustrated.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-034800, which was filed on Mar. 7, 2023 and which is hereby incorporated by reference herein in its entirety.

What is claimed is:

1. An imaging apparatus comprising:
at least one processor; and
a memory coupled to the at least one processor, the memory storing instructions that, when executed by the at least one processor, cause the at least one processor to:
acquire a parameter related to a brightness of a subject;
determine whether to insert a first filter configured to attenuate infrared light into a light path of an imaging optical system, based on whether the acquired parameter satisfies a predetermined condition; and
correct the predetermined condition based on whether a second filter different from the first filter and configured to attenuate light is inserted into the light path of the imaging optical system.

2. The imaging apparatus according to claim 1, wherein the instructions cause the at least one processor to:
if the acquired parameter is equal to or greater than a first threshold, determine that the first filter is to be inserted into the light path of the imaging optical system, and
if the acquired parameter is smaller than a second threshold, determine that the first filter is to be removed from the light path of the imaging optical system.

3. The imaging apparatus according to claim 2, wherein the instructions cause the at least one processor to:
if the second filter is inserted into the light path of the imaging optical system, correct the first threshold and the second threshold to be increased.

4. The imaging apparatus according to claim 3, wherein the instructions cause the at least one processor to:
determine a correction amount for each of the first threshold and the second threshold based on transmittance of the second filter.

5. The imaging apparatus according to claim 4, wherein the instructions cause the at least one processor to:
store the transmittance of the second filter; and
determine the correction amount based on the stored transmittance.

6. The imaging apparatus according to claim 4, wherein the instructions cause the at least one processor to:
calculate the transmittance of the second filter based on the parameter related to the brightness of the subject when the second filter is inserted into the light path of the imaging optical system and the parameter related to the brightness of the subject when the second filter is removed; and
determine the correction amount based on the calculated transmittance.

7. The imaging apparatus according to claim 1, wherein the instructions cause the at least one processor to:
correct the acquired parameter based on whether the second filter is inserted into the light path of the imaging optical system.

8. The imaging apparatus according to claim 7, wherein the instructions cause the at least one processor to:
if the second filter is inserted into the light path of the imaging optical system, correct the acquired parameter to be decreased.

9. The imaging apparatus according to claim 8, wherein the instructions cause the at least one processor to:
determine a correction amount for the acquired parameter based on transmittance of the second filter.

10. The imaging apparatus according to claim 1, wherein the first filter is an infrared cut filter, and the second filter is a neutral density (ND) filter.

11. A method comprising:
acquiring a parameter related to a brightness of a subject;
determining whether to insert a first filter configured to attenuate infrared light into a light path of an imaging optical system, based on whether the acquired parameter satisfies a predetermined condition; and
correcting the predetermined condition based on whether a second filter different from the first filter and configured to attenuate light is inserted into the light path of the imaging optical system.

12. The method according to claim 11, further comprising:
if the acquired parameter is equal to or greater than a first threshold, determining that the first filter is to be inserted into the light path of the imaging optical system, and
if the acquired parameter is smaller than a second threshold, determining that the first filter is to be removed from the light path of the imaging optical system.

13. The method according to claim 12, further comprising:
if the second filter is inserted into the light path of the imaging optical system, correcting the first threshold and the second threshold to be increased.

14. The method according to claim 13, further comprising:
determining a correction amount for each of the first threshold and the second threshold based on transmittance of the second filter.

15. The method according to claim 14, further comprising:
storing the transmittance of the second filter; and
determining the correction amount based on the stored transmittance.

16. The method according to claim 14, further comprising:
calculating a degree of dimming of the second filter, based on the parameter related to the brightness of the subject when the second filter is inserted into the light path of the imaging optical system and the parameter related to the brightness of the subject when the second filter is removed; and
determining the correction amount based on the calculated degree of dimming.

17. The method according to claim 11, further comprising:
correcting the acquired parameter based on whether the second filter is inserted into the light path of the imaging optical system.

18. The method according to claim 17, further comprising:
if the second filter is inserted into the light path of the imaging optical system, correcting the acquired parameter to be decreased.

19. The method according to claim 18, further comprising:

determining a correction amount for the acquired parameter based on the degree of dimming of the second filter.

20. A non-transitory computer-readable medium storing computer-executable instructions for causing a computer to execute a method comprising:

acquiring a parameter related to a brightness of a subject;

determining whether to insert a first filter configured to attenuate infrared light into a light path of an imaging optical system, based on whether the acquired parameter satisfies a predetermined condition; and correcting the predetermined condition based on whether a second filter different from the first filter and configured to attenuate light is inserted into the light path of the imaging optical system.

* * * * *